Patented Nov. 16, 1937

2,099,241

UNITED STATES PATENT OFFICE 2,099,241

PACKING COMPOSITION

Hugh T. Stewart, Palmyra, N. Y., assignor to The Garlock Packing Company, Palmyra, N. Y., a corporation of New York No Drawing. Application September 26, 1935, Serial No. 42,281

3 Claims. (Cl. 106—7.6)

My present invention relates to packing composition for use in stuffing boxes and other joints in mechanism or apparatus wherein fluids, particularly liquid and gaseous hydrocarbons under pressure, are employed, and aims to provide certain improvements in such composition.

The primary object of my invention is to provide a novel and improved packing composition which is capable of withstanding and resisting the destructive and disintegrating effect of contact with liquid and gaseous hydrocarbons. A further object is to provide a substantially homogeneous packing composition which can be formed or molded into special shapes or sections of definite dimensions so as to be readily adaptable for use in stuffing boxes or other joints where a packing of the type described is essential. A further object is to produce a packing material having, in addition to the aforementioned characteristics, as low a coefficient of friction as is mechanically possible.

The foregoing and other objects of my invention not specifically enumerated I accomplish by providing a packing material comprising as an essential constituent thereof a dispersed polymer of chloroprene or polychloroprene which acts both as the hydrocarbon resistant component and as a cement or binder for the other constituent materials of the packing, which constituent materials may include resilient fibers, lubricating material, powdered metal, etc. My invention will be better understood from the detailed description and specific examples of packing compositions which follow and the method of procedure of forming the packing composition.

Polychloroprene or the alpha polymer of chloroprene is a synthetic plastic produced by the E. I. duPont deNemours & Co., Inc., and sold under the name "Duprene". Its composition is accepted as being $(C_4H_5Cl)x$ since its molecular weight is not determinable. This polychloroprene, which serves as the destructive and disintegrating resisting element of the packing composition, as well as the binder for the other constituent materials of the packing, is first treated to provide a dispersion thereof in a suitable solution, to which dispersion is added the other ingredients of the packing to form a dough-like plastic mass which may be formed or molded to required shape. Preferably the polychloroprene is first compounded with suitable compounding materials before it is dispersed in solution.

In practice one mode of procedure in forming the packing composition according to my invention, is as follows: The alpha polymer of chloroprene is broken down on a mixing mill and light calcined magnesium oxide is added thereto as rapidly as possible, followed by the addition of phenylbetanaphthalamine, wood rosin and zinc oxide, the magnesium oxide, phenylbetanaphthalamine, wood rosin and zinc oxide being compounding constituents. This mill stock is then placed in a suitable mixer containing a suitable volatile solvent such as hydrogenated naphtha, and the contents mixed until the compounded alpha polymer of chloroprene is completely dispersed in the hydrogenated naphtha to form a viscous solution. To this solution is then added the other constituent materials of the packing, for example, asbestos, powdered metal, graphite and oil, and the mixing continued until the mix becomes a heavy dough-like plastic mass.

The plastic mass may be molded or otherwise shaped to required form, depending upon the ultimate desired shapes of the packings required, and the hydrogenated naphtha evaporated therefrom, leaving the dry cemented packings containing the dispersed alpha polymer of chloroprene in substantially their original size and shape. The preformed or molded packings are then heat-treated for approximately thirty minutes at a temperature of about 130° C. whereby the alpha polymer of chloroprene is polymerized to a stable compound which is highly resistant to liquid and gaseous hydrocarbons.

Examples of packing compositions formed in accordance with my invention which I have found to be highly resistant to liquid and gaseous hydrocarbons, are as follows:

Example 1

| | Per cent |
|---|---|
| Alpha-polymer of chloroprene | 1.96 |
| Asbestos fibre | 21.56 |
| "Bearium" alloy (bronze) | 47.06 |
| Powdered graphite | 29.42 |
| | 100.00 |

Example 2

| | Per cent |
|---|---|
| Alpha-polymer of chloroprene | 4.3 |
| S. A. E. 20 oil | 3.0 |
| Asbestos fibre | 30.0 |
| Powdered aluminum | 18.0 |
| Powdered graphite | 44.7 |
| | 100.00 |

Example 3

|  | Per cent |
|---|---|
| Alpha-polymer of chloroprene | 7.33 |
| S. A. E. 20 oil | 4.89 |
| Asbestos fibre | 29.26 |
| Powdered aluminum | 14.64 |
| Powdered graphite | 43.88 |
|  | 100.00 |

Example 4

|  | Per cent |
|---|---|
| Alpha-polymer of chloroprene | 9.09 |
| S. A. E. 20 oil | 9.09 |
| Asbestos fibre | 27.27 |
| Powdered aluminum | 13.63 |
| Powdered graphite | 40.92 |
|  | 100.00 |

Example 5

|  | Per cent |
|---|---|
| Alpha-polymer of chloroprene | 12.5 |
| S. A. E. 20 oil | 10.0 |
| Asbestos fibre | 25.0 |
| Powdered aluminum | 15.0 |
| Powdered graphite | 37.5 |
|  | 100.00 |

From the foregoing specific examples it will be apparent that the percentage compositions of the various constituents of the packing compositions range as follows:

|  | Per cent |
|---|---|
| Alpha-polymer of chloroprene approximately | 2 to 13 |
| S. A. E. 20 oil do | 3 to 10 |
| Asbestos fibre do | 20 to 30 |
| Powdered aluminum do | 13 to 18 |
| Powdered graphite do | 30 to 45 |

In the foregoing specific examples it will be noted that no compounding materials are mentioned as being added to the polychloroprene, but in practice such compounding materials are frequently used. In Example No. 5, for instance, if the percentage compositions represented pounds of material there might be added compounding ingredients in the following amounts:

|  | Ounces |
|---|---|
| Light calcined magnesium oxide | 20 |
| Phenylbetanaphthalamine | 4 |
| Wood rosin | 10 |
| Zinc oxide | 20 |

The various component materials of the packing, it will be appreciated, operate to modify the physical characteristics of the final product. For example, an increase in the amount of binding component tends to increase the tensile strength, resiliency and elasticity of the mass. At the same time, however, it increases its frictional coefficient, hence the amount of binding component must be so chosen as to produce a packing with as low a coefficient of friction as is mechanically possible.

To increase the fibrous material in the compound tends to decrease the resiliency, elasticity and internal strength, and where asbestos is the fibre used it tends to increase its heat resistance. The frictional coefficient possibly would likewise be increased in a limited degree.

An increase in the amount of metal and graphite in the compound would tend to reduce materially frictional coefficients but at the same time would greatly reduce the resiliency and elasticity of the mass. It would also increase its density and produce an increasingly bearing-like substance lacking the fundamental qualities of a packing material or seal.

The oils in the compound may be used either for their lubricating qualities or as softeners and plasticizers, or both. To a limited extent oil will overcome rigidity in the mass but it must be used with caution because of its plasticizing effect. If used in excessive quantities it will so soften the mass and will be extruded from stuffing boxes under normal gland pressure.

From the foregoing detailed description it will be appreciated that various changes in proportions and equivalents of the component materials of the packing may be made by those skilled in the art, depending upon the desired characteristics of the final product. Hence I do not wish to be limited to the specific examples hereinbefore given nor to the specific mode of procedure in forming the packing since these too may be varied without departing from the spirit of the invention.

What I claim is:

1. A packing composition consisting of an intimate mixture of asbestos, graphite, powdered aluminum, lubricating oil, and dispersed compounded polychloroprene.

2. A packing composition having the following composition:

|  | Per cent |
|---|---|
| Alpha-polymer of chloroprene approximately | 2–13 |
| Lubricating oil do | 3–10 |
| Fibres do | 20–30 |
| Powdered aluminum do | 13–18 |
| Powdered or flake graphite do | 30–45 |

3. A packing composition having the following composition:

|  | Per cent |
|---|---|
| Alpha-polymer of chloroprene | 12½ |
| Lubricating oil (S. A. E. #20) | 10 |
| Asbestos fibre | 25 |
| Powdered aluminum | 15 |
| Powdered graphite | 37½ |

HUGH T. STEWART.